US012595811B2

(12) United States Patent
Tewes et al.

(10) Patent No.: US 12,595,811 B2
(45) Date of Patent: Apr. 7, 2026

(54) SEAL PLATE METHOD FOR COMMUNICATING RETRACT OIL TO RETRACT SIDE OF PISTON IN HYDRAULIC CYLINDER

(71) Applicant: Rosenboom Machine & Tool, Inc., Sheldon, IA (US)

(72) Inventors: Allen John Tewes, Sheldon, IA (US); Darin M. Rosenboom, Sheldon, IA (US); Don Fjeld, Sheldon, IA (US)

(73) Assignee: Rosenboom Machine & Tool, Inc., Sheldon, IA (US)

( * ) Notice: Subject to any disclaimer, the term of this patent is extended or adjusted under 35 U.S.C. 154(b) by 0 days.

(21) Appl. No.: 19/192,976

(22) Filed: Apr. 29, 2025

(65) Prior Publication Data

US 2025/0334135 A1 Oct. 30, 2025

Related U.S. Application Data

(60) Provisional application No. 63/640,665, filed on Apr. 30, 2024.

(51) Int. Cl.
*F15B 15/14* (2006.01)

(52) U.S. Cl.
CPC ........ *F15B 15/149* (2013.01); *F15B 15/1471* (2013.01); *F15B 15/1428* (2013.01); *F15B 15/1447* (2013.01)

(58) Field of Classification Search
CPC .......................... F15B 15/1471; F15B 15/149; F15B 15/1428; F15B 15/1447; F15B 15/204; F15B 15/1433; F15B 15/1438; F15B 2211/30505
See application file for complete search history.

(56) References Cited

U.S. PATENT DOCUMENTS

| | | | | | |
|---|---|---|---|---|---|
| 3,162,092 | A * | 12/1964 | Corwin | F15B 15/227 92/164 |
| 3,266,810 | A | 8/1966 | Reeser | |
| 3,272,132 | A * | 9/1966 | Stoelting | A23G 9/20 417/440 |
| 4,099,450 | A * | 7/1978 | Mase | F15B 13/044 91/452 |

(Continued)

FOREIGN PATENT DOCUMENTS

| | | |
|---|---|---|
| CN | 210397074 U | 4/2020 |
| CN | 211778325 U | 10/2020 |

(Continued)

*Primary Examiner* — William H Rodriguez
(74) *Attorney, Agent, or Firm* — McKee, Voorhees & Sease, PLC

(57) ABSTRACT

A double acting hydraulic cylinder can move in two directions due to hydraulic oil pressing on opposite sides of a piston. To improve on double acting cylinder operation, a seal plate is placed adjacent the cylinder to separate extend and retract cavities of the cylinder. The seal plate is sized to allow oil to pass by an outer edge to pass through a cavity in the cylinder to move the oil to the retract side of the piston. The seal plate also seals the system so oil used for the extension of the cylinder is not allowed to pass into the retract side. In essence, the seal plate allows the retract port to be moved to the same end of the cylinder as the extension port to make mounting or positioning of the cylinder more accessible.

17 Claims, 6 Drawing Sheets

(56) References Cited

U.S. PATENT DOCUMENTS 4,211,150 A * 7/1980 Framberg ................ F15B 15/04 92/167
4,337,687 A * 7/1982 Hoover ............... F15B 15/1447 91/401
4,384,511 A * 5/1983 Mefferd .............. F15B 15/1438 92/164
4,787,781 A 11/1988 Bradberry
5,269,592 A 12/1993 Martin
5,341,725 A 8/1994 Dick
5,983,778 A 11/1999 Dawson
6,123,516 A 9/2000 Burghard et al.
6,283,667 B1 9/2001 Neitzel
6,386,088 B1 * 5/2002 Yoshimoto ............ F16F 9/3228 91/405
7,543,656 B2 6/2009 Dorval
8,567,185 B1 * 10/2013 Theobald ................. B25J 9/144 901/22
10,947,998 B2 * 3/2021 Kojima ............... F15B 15/1438
2002/0096043 A1 7/2002 Dawson
2002/0150487 A1 10/2002 Vonalt et al.
2002/0162449 A1 11/2002 Futami et al.
2004/0154237 A1 8/2004 Mainville
2011/0154920 A1 6/2011 Weyer
2011/0192157 A1 * 8/2011 Ogawa .................... F15B 21/14 60/473
2014/0102293 A1 * 4/2014 Miller ........................ F16J 7/00 92/172
2015/0184681 A1 * 7/2015 Ogawa .................. F15B 15/224 92/82
2017/0051766 A1 * 2/2017 Wi ......................... F15B 15/149
2017/0088256 A1 * 3/2017 Kondo .................. F15B 15/226
2018/0031011 A1 * 2/2018 Kudo .................. F15B 15/1447
2018/0156247 A1 * 6/2018 Revenus ............... F15B 15/149
2018/0252245 A1 * 9/2018 Sakaue ................... E21B 23/04
2019/0085872 A1 * 3/2019 Ogawa .................. F15B 15/149
2021/0003152 A1 * 1/2021 Kudo ................... F16J 15/3232
2022/0243708 A1 * 8/2022 Bridges ................... F04B 9/113
2023/0366414 A1 11/2023 Rosenboom et al.
2024/0060518 A1 * 2/2024 Takahashi ............. F04B 9/1174
2025/0122894 A1 * 4/2025 Weihl ......................... F15B 1/04

FOREIGN PATENT DOCUMENTS

CN 213235618 U 5/2021
DE 3610882 C2 1/1989
EP 1293309 B1 6/2004
EP 3258142 B1 1/2023
JP 3905753 B2 4/2007
RU 2105130 C1 2/1998
RU 2164628 C1 3/2001
RU 2283960 C1 9/2006
WO 2014001020 A1 1/2014

* cited by examiner

SEAL PLATE METHOD FOR COMMUNICATING RETRACT OIL TO RETRACT SIDE OF PISTON IN HYDRAULIC CYLINDER

CROSS REFERENCE TO RELATED APPLICATIONS

This application claims priority under 35 U.S.C. § 119(e) to provisional patent application U.S. Ser. No. 63/640,665, filed Apr. 30, 2024. The provisional patent application is hereby incorporated by reference in its entirety herein, including without limitation: the specification, claims, and abstract, as well as any figures, tables, appendices, or drawings thereof.

TECHNICAL FIELD

The present disclosure relates generally to hydraulic cylinders. More particularly, but not exclusively, the disclosure includes systems, methods, and/or apparatus related to hydraulic cylinders that improves the functionality of the extension and retraction of the cylinders.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

A hydraulic cylinder (also called a linear hydraulic motor) is a mechanical actuator that is used to give a unidirectional force through a unidirectional stroke. It has many applications, notably in construction equipment (engineering vehicles), manufacturing machinery, elevators, and civil engineering. A hydraulic cylinder is a hydraulic actuator that provides linear motion when hydraulic energy is converted into mechanical movement. It can be likened to a muscle in that, when the hydraulic system of a machine is activated, the cylinder is responsible for providing the motion.

Hydraulic cylinders get their power from pressurized hydraulic fluid, which is incompressible. Typically, oil is used as hydraulic fluid. The hydraulic cylinder consists of a cylinder barrel, in which a piston connected to a piston rod moves back and forth. The barrel is closed on one end by the cylinder bottom (also called the cap) and the other end by the cylinder head (also called the gland) where the piston rod comes out of the cylinder. The piston has sliding rings and seals. The piston divides the inside of the cylinder into two chambers, the bottom chamber (cap end) and the piston rod side chamber (rod end/head-end).

Some hydraulic cylinders are single acting or double acting. A single-acting cylinder in a reciprocating engine is a cylinder in which the working fluid acts on one side of the piston only. A single-acting cylinder relies on the load, springs, other cylinders, or the momentum of a flywheel, to push the piston back in the other direction. Single-acting cylinders are found in most kinds of reciprocating engine. They are almost universal in internal combustion engines and are also used in many external combustion engines such as Stirling engines and some steam engines. They are also found in pumps and hydraulic rams.

A double-acting cylinder is a cylinder in which the working fluid acts alternately on both sides of the piston. In order to connect the piston in a double-acting cylinder to an external mechanism, such as a crank shaft, a hole must be provided in one end of the cylinder for the piston rod, and this is fitted with a gland or "stuffing box" to prevent escape of the working fluid. Many hydraulic and pneumatic cylinders use them where it is needed to produce a force in both directions. A double-acting hydraulic cylinder has a port at each end, supplied with hydraulic fluid for both the retraction and extension of the piston. A double-acting cylinder is used where an external force is not available to retract the piston or it can be used where high force is required in both directions of travel.

With the double acting cylinders, the location of the dual external ports can cause issues. For example, there needs to be clearance in mounting or positioning the cylinder such that both ports are accessible. In addition, the location of the ports can cause troubles when connecting hoses, conduits, or other fluid moving components, as they may get in the way of the operation of the cylinder.

While there have been attempts to address this concern, issues remain. For some systems, extensive welding and machining is required, but this can result in poor durability/pressure rating vs. a thick walled tube with a deep drilled hole. Others have a deep drilled tube with an external hydraulic line. However, this is very difficult and costly to weld, which can lead to poor product quality and failures in the field.

Thus, there exists a need in the art for a hydraulic cylinder apparatus or system which improves upon existing double acting cylinders and improves the overall package/envelope by moving the ports to a more desirable position.

SUMMARY

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of any of the aspects and/or embodiments of the present disclosure to improve on or overcome the deficiencies in the art.

It is a further object, feature, and/or advantage of any of the aspects and/or embodiments of the present disclosure to seal a retraction path from the extension path and vice versa for a hydraulic cylinder. The sealing of the chambers within the cylinder will allow for improved placement of the extend and retract ports, while also allowing for improved durability of the cylinder. There is less need to rely upon difficult welding of components to attempt to keep the chambers separate from one another.

It is still yet a further object, feature, and/or advantage of any of the aspects and/or embodiments of the present disclosure to position the extension and retraction oil ports at or near each other.

The system and/or apparatus disclosed herein can be used in a wide variety of applications. For example, generally any industry that utilizes cylinders could include the aspects and/or embodiments disclosed.

It is preferred that the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the hydraulic cylinder.

The hydraulic cylinder can be incorporated into systems or kits which accomplish some or all of the previously stated objectives.

According to some aspects of the present disclosure, hydraulic cylinder comprises a cylinder housing; a piston and cylinder rod positioned in the cylinder housing, the piston rod adjacent a base end of the cylinder housing; an extension port and a retraction port positioned adjacent one another and comprising inputs into the cylinder housing; and a seal plate adjacent the piston at the base end of the cylinder housing, the seal plate sealing a retraction path from an extension path of hydraulic oil to aid in directing the oil to the desired side of the piston for extension and retraction.

According to at least some aspects of some embodiments, the cylinder housing comprises a cylinder tube extending from the base end.

According to at least some aspects of some embodiments, the retraction path extends from the retraction port, outside of the seal plate, and through a portion of the cylinder housing to a retraction side of the piston.

According to at least some aspects of some embodiments, the seal plate comprises a T-shape with a flange portion extending towards the retraction path to seal the retraction path from the extension path.

According to at least some aspects of some embodiments, the seal plate comprises O-rings at interior and exterior portions to aid in sealing.

According to at least some aspects of some embodiments, the cylinder further comprises a check valve in line with the extension and retraction ports in the base end of the cylinder housing.

According to at least some aspects of some embodiments, the cylinder further comprises an aperture through a distal end of the cylinder rod.

According to at least some aspects of some embodiments, the extension and retraction ports are offset from one another at the base end of the cylinder housing.

According to at least some aspects of some embodiments, the cylinder further comprises a cylinder rod wiper at a distal end of the cylinder housing away from the base end, the cylinder rod wiper configured to clean a portion of the cylinder rod.

According to additional aspects of the disclosure, a hydraulic cylinder comprises a cylinder housing; a piston and cylinder rod positioned in the cylinder housing, the piston rod adjacent a base end of the cylinder housing; an extension port fluidly connected to an extension path for supplying a hydraulic fluid from the extension port to the extension side of the piston and cylinder rod; a retraction portion fluidly connected to a retraction path for supplying the hydraulic fluid from the retraction port to a retraction side of the piston and cylinder rod; and a seal plate adjacent the piston at the base end of the cylinder housing, the seal plate sealing the retraction path from the extension path of hydraulic fluid; and wherein the extension port and retraction port are positioned adjacent one another on the cylinder housing.

According to at least some embodiments of the disclosure, the cylinder housing comprises a cylinder tube extending from the base end.

According to at least some embodiments of the disclosure, the retraction path extends from the retraction port, outside of the seal plate, and through a portion of the cylinder housing to a retraction side of the piston.

According to at least some embodiments of the disclosure, the seal plate comprises a T-shape with a flange portion extending towards the retraction path to seal the retraction path from the extension path.

According to at least some embodiments of the disclosure, the seal plate comprises O-rings at interior and exterior portions to aid in sealing.

According to at least some embodiments of the disclosure, the extension and retraction ports are offset from one another at the base end of the cylinder housing.

According to at least some embodiments of the disclosure, the cylinder further comprises a check valve in line with the extension and retraction ports in the base end of the cylinder housing.

According to additional aspects of the disclosure, a method of operating a hydraulic cylinder comprises extending a cylinder rod by supplying a hydraulic oil via an extension port and through an extension path to the extension side of the piston and cylinder rod; retracting the cylinder rod by supplying they hydraulic oil via a retraction port and through a retraction path to a retraction side of the piston and cylinder rod; and separating the extension and retraction paths with an end seal plate adjacent the piston at the base end of the cylinder housing; wherein the extension port and the retraction port are positioned adjacent one another on the cylinder housing.

According to at least some embodiments of the disclosure, the retraction path extends from the retraction port, outside of the seal plate, and through a portion of the cylinder housing to a retraction side of the piston.

According to at least some embodiments of the disclosure, the method further comprises passing the hydraulic oil through a check valve in the extension path to mitigate back flow of the hydraulic oil in an unwanted direction.

According to at least some embodiments of the disclosure, both the extension and retraction paths include a check valve in line with the paths.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
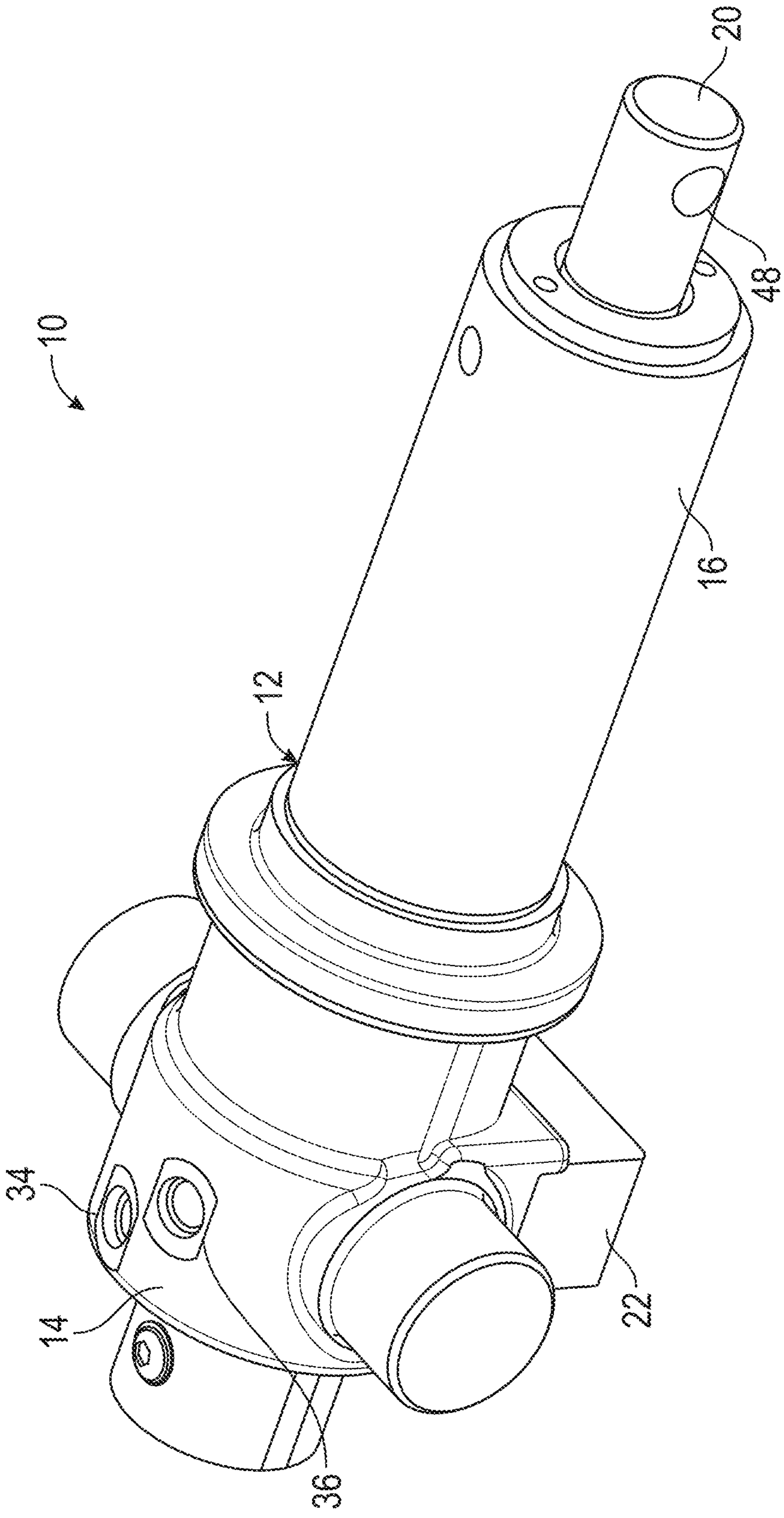
FIG. 1 is a perspective view of a hydraulic cylinder according to at least some aspects of some embodiments of the present disclosure.

An artisan of ordinary skill in the art need not view, within isolated figure(s), the near infinite distinct combinations of features described in the following detailed description to facilitate an understanding of the present disclosure.

DETAILED DESCRIPTION

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Referring now to the figures, a hydraulic cylinder 10 is shown. The hydraulic cylinder 10 shown in the figures can be generally any type of hydraulically activated cylinder, such as those that utilize oil to activate the cylinder. In addition, it should be noted that that the cylinder 10 is a double acting cylinder, which means that the hydraulic oil is used to both extend and retract a cylinder rod 20 via a piston 18. For such types of cylinders, the oil is pressed upon opposite sides of the piston 18 within the housing 12 of the cylinder 10. When the oil is added to the extend side of the piston 18, the piston 18 and cylinder rod 20 will be moved or extended outwardly from the housing 12. When the oil on the extend side is removed and instead added to the retraction side of the piston 18, the piston 18 and cylinder rod 20 will move or retract into the housing 12. Thus, the cylinder rod 20 moves in a linear manner extending from and retracting into the housing of the cylinder. The amount of movement and timing of movement is controllable by the addition and retraction of the hydraulic oil to allow for control of the movement of the rod.

As is known, the cylinder rod 20 could have an aperture 48 or other mounting mechanism at a distal end of the rod 20. This portion is used to connect the rod 20 to another component that will be manipulated (i.e., moved) via the extension and/or retraction of the rod 20. While the aperture is provided, it should be appreciated that generally any type of mount or mounting/connecting features be included as part of the disclosure.

FIG. 1 shows a perspective view of a hydraulic cylinder 10 including features and/or aspects of the present disclosure. The cylinder 10 includes a housing 12 comprising a base end 14 and a cylinder tube 16 operatively connected to one another. The base end 14 can also be referred to as the proximal end of the cylinder 10. Attached to the bottom of the base end 14 is a saddle plate 22 that is connected to the cylinder 10, such as via bolts 24 or other mechanical fasteners. The saddle plate 22 can be used to connect the base end 14 of the cylinder to a surface or component for use.

Also shown extending through and into the base end 14 of the cylinder 10 is a retract port 34 and an extend port 36. The ports 34, 36 are used to connect to a hydraulic oil source and are the ports and passages for the oil to pass into and out of the cylinder 10 for extension or retraction of the cylinder rod 20. As shown, the ports 34, 36 are adjacent one another and slightly offset from one another. The retract port 34 is closer to the proximal end of the cylinder 10 while the extend port is slightly distal. The ports are also slightly rotated radially from one another. This allows the ports to be positioned adjacent one another, while ensuring there is clearance for the conduits or other oil connections and also for the resulting paths for the oil in the cylinder housing.

Typically, the ports 34, 36 are positioned on opposed ends of the cylinder housing 12, such as on opposite sides of the piston 18. This ensures a direct path to the side of the piston for extension and retraction of the rod 20 due to the oil acting on a particular side of the piston 18. However, as noted, this creates issues, especially when determining mounting positions for the cylinder to ensure there is clearance for all components. As will be understood, the use of an end seal plate 30 in the cylinder 10 allows for the adjacent positioning of the ports and other improvements and/or advantages. For example, the seal plate 30 allows oil ports on the base end to connect to the retract and extend chambers without the use of hydraulic lines or passing through the rod. Thus, the seal plate 30 allows for novel systems and methods for separating the extend and retract ports from the retract/extend chambers of the cylinder. This provides numerous advantages, such as product manufacturability and product durability.

Additional components shown in the figures and that are housed in the cylinder 10 include a check valve 26 in or at the base end 14 of the housing 12. Check valves are the simplest form of hydraulic devices in that they permit free flow in one direction and block flow in the opposite direction. Check valves may be used as a directional or pressure control in a hydraulic system. Therefore, the check valve 26 can aid in controlling the direction of flow, such as the oil, or can aid in controlling the pressure in the cylinder 10.

Figure 2:
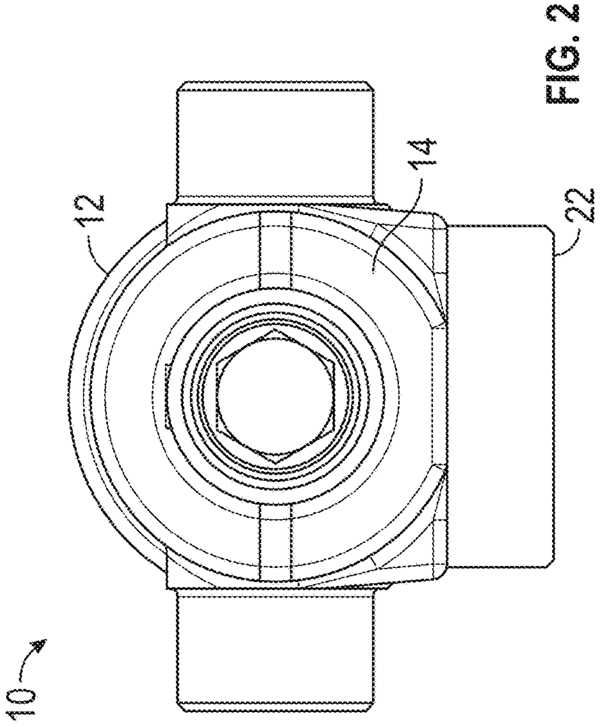
FIG. 2 is an end view from a base end of the hydraulic cylinder.

FIG. 2 is an end view showing the cylinder 10 looking at the base end 14 of the system. This figure also shows the saddle plate 22 that can be used to mount the cylinder 10 to another location.

Figure 3:
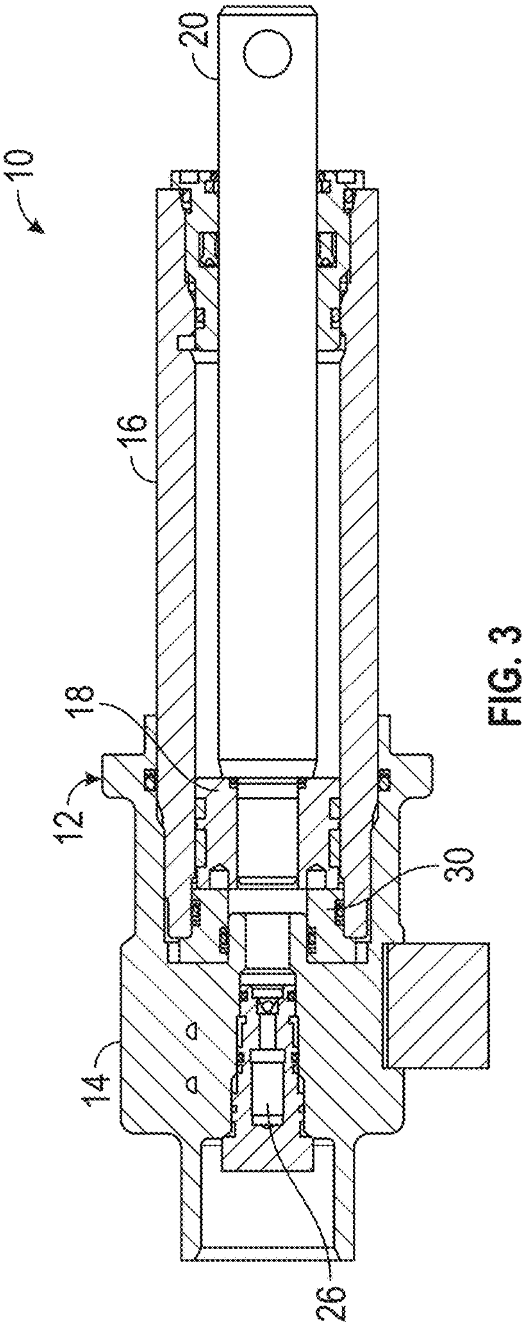
FIG. 3 is a sectional view of the hydraulic cylinder.
Figure 4:
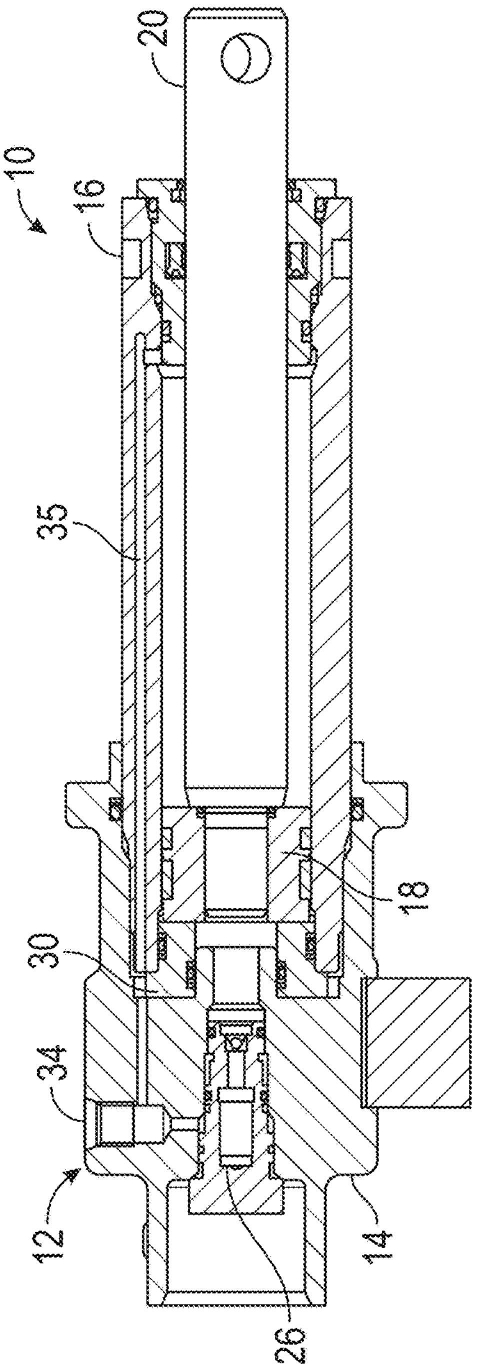
FIG. 4 is another sectional view of the hydraulic cylinder showing a retraction path for the hydraulic oil.
Figure 5:
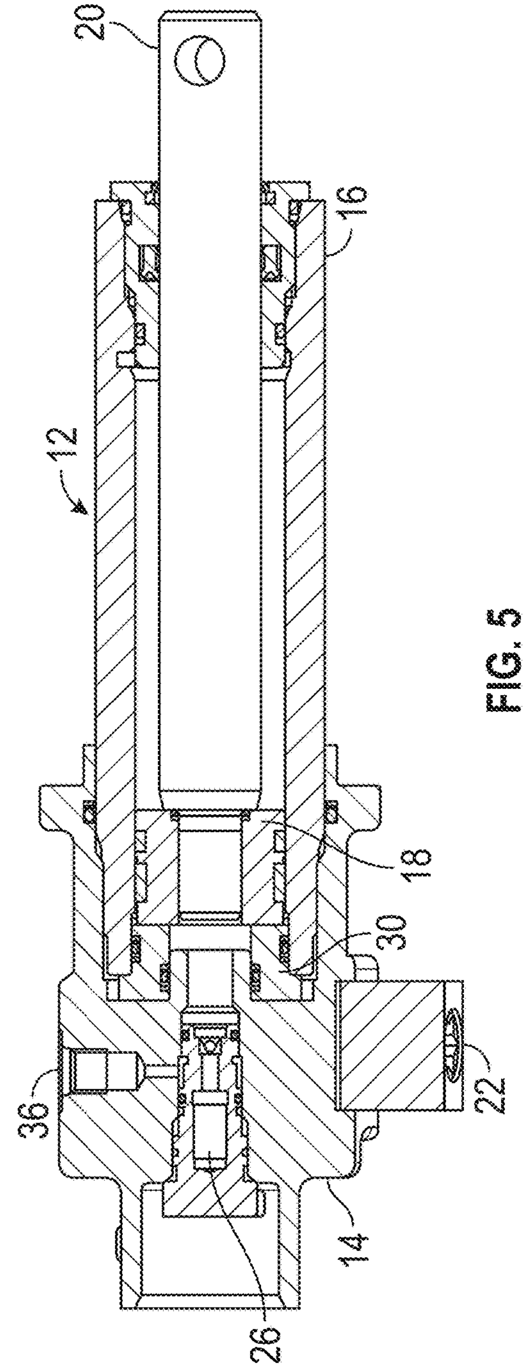
FIG. 5 is another sectional view of the hydraulic cylinder showing an extension path for the hydraulic oil.

FIGS. 3-5 show sectional views of the cylinder 10, which highlight some additional components and portions of the cylinder. FIG. 3 shows the check valve 26 in the base end 14 of the cylinder housing 12. The figure also shows that the cylinder housing 12 includes the base end 14 and a cylinder tube 16. The cylinder tube 16 extends away from the base end 14 and encloses a portion of the cylinder rod 20. The rod 20 extends in such a manner that it appears that the rod is extending from the tube 16.

The Figures also show the positioning of the piston 18 at the end of the cylinder rod 20 within the housing 12. As noted, the piston includes opposing surfaces upon which the oil acts to move the rod and piston. The right side of the piston 18 can also be referred to as the retraction side, while the left side of the piston 18 in the figures can be referred to as the extension side. These are the sides that the oil would act on to extend or retract the piston and rod. The size of the piston, such as the diameter, controls the surface area to which the oil can act, which can determine the effectiveness of and/or movability of the rod 20.

Also shown in the figures adjacent the piston 18 is an end seal plate 30. As is shown, the end seal plate 30 is a T-shaped or top hat shaped member that includes a cylinder portion 31 and a flange portion 32. The cylinder portion 31 of the end seal plate 30 has a smaller diameter than the flange portion 32. However, the end seal plate 30 could have different dimensions and/or configurations than shown, such as being all cylindrical or including more variations in diameters. The end seal plate 30 is used to separate extend and retract cavities or paths of the cylinder 10.

For example, FIG. 4 is a sectional view that shows the retract port 34 and retract path 35. This is the path of the oil when the cylinder is to be retracted. In other words, the oil is entered through the port 34 and through the path 35 to act upon the right side (i.e., retract side) of the piston 18, which will cause the piston 18 and rod 20 to retract into the housing 12 (move to the left in the figures). The path 35 extends along a length of the cylinder tube 16 to a location where it will enter the cavity on the right side of the piston 18. The oil reverses this same path when the oil is removed, such as when extending the cylinder rod 20.

FIG. 5 shows a sectional view detailing the extend port 36 and resulting extend path. This is the path for the oil to be directed to the left side (i.e., extend side) of the piston 18, which will cause the piston 18 and the rod 20 to extend from the housing (move to the right in the figures).

Previously, the retract port 34 would be positioned further right or distally on the cylinder housing. This kept the extend and retract paths or cavities from being open to one another. However, this also added difficulty for mounting the oil conduits and other portions of the cylinder. Therefore, moving the ports adjacent to one another allows for greater flexibility and use of the cylinder 10. The seal plate 30 is positioned generally between the extension and retraction cavities to allow for the ports to be positioned adjacent to one another. The seal plate 30 is sized and shaped to be the seal to mitigate any movement of the oil from the extend cavity to the retraction cavity, and vice versa.

Figure 10:
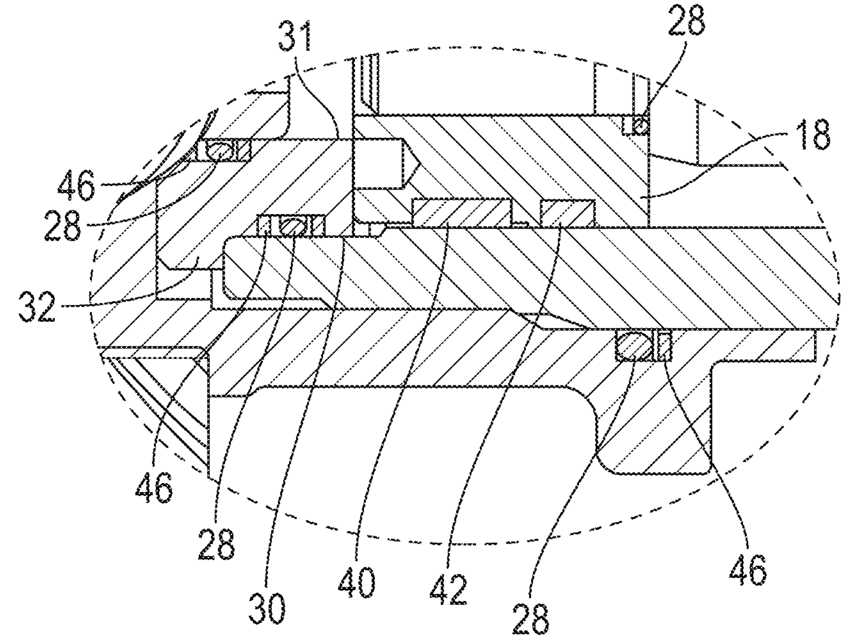
FIG. 10 is an enlarged sectional view showing a portion of the end seal plate for use with the hydraulic cylinder.

The seal plate 30 comprises generally rigid materials, including, but not limited to ductile iron, steel, iron, or generally any metallic or composite material. In addition, as shown best in FIG. 10, backup rings 46, O-rings 28, wear bands 40, and a piston seal 42 is included with the seal plate 30 and the piston 18 to further seal the components and mitigate oils, gases, or other liquids from passing through the components in an unwanted manner. FIG. 10 also shows the shape of the seal plate 30, including the cylinder portion 31 and the flange portion 32, as well as the positioning of the seal plate 30 relative to the piston 18 in the cylinder housing 12.

Figure 6:
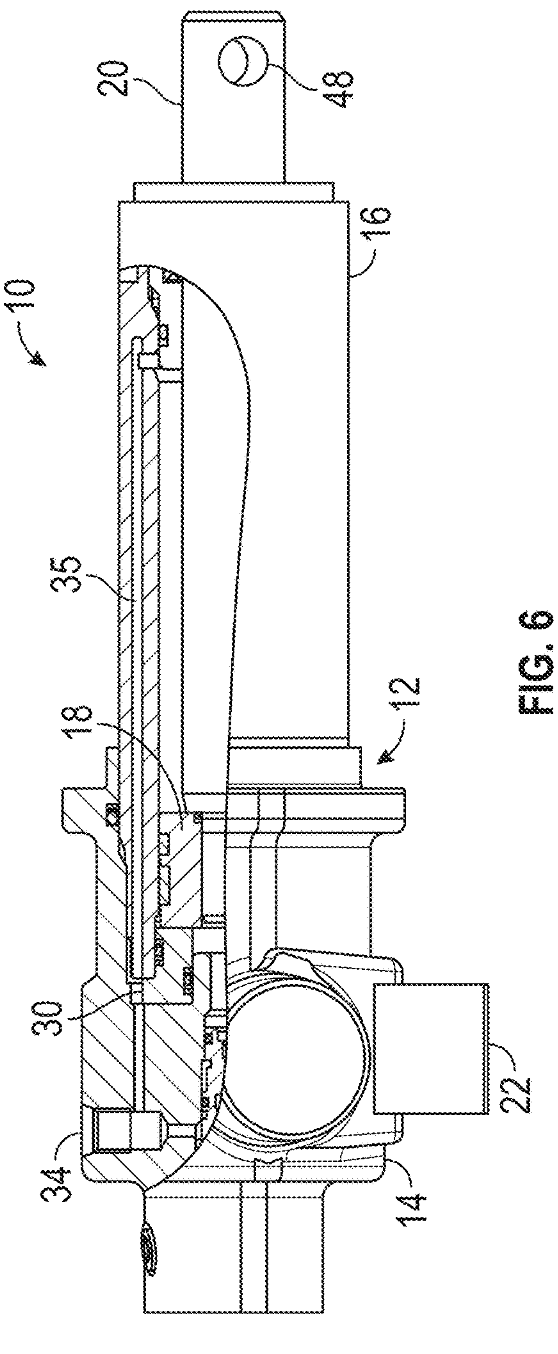
FIG. 6 is a partial, sectional view of the hydraulic cylinder showing the retraction path.
Figure 7:
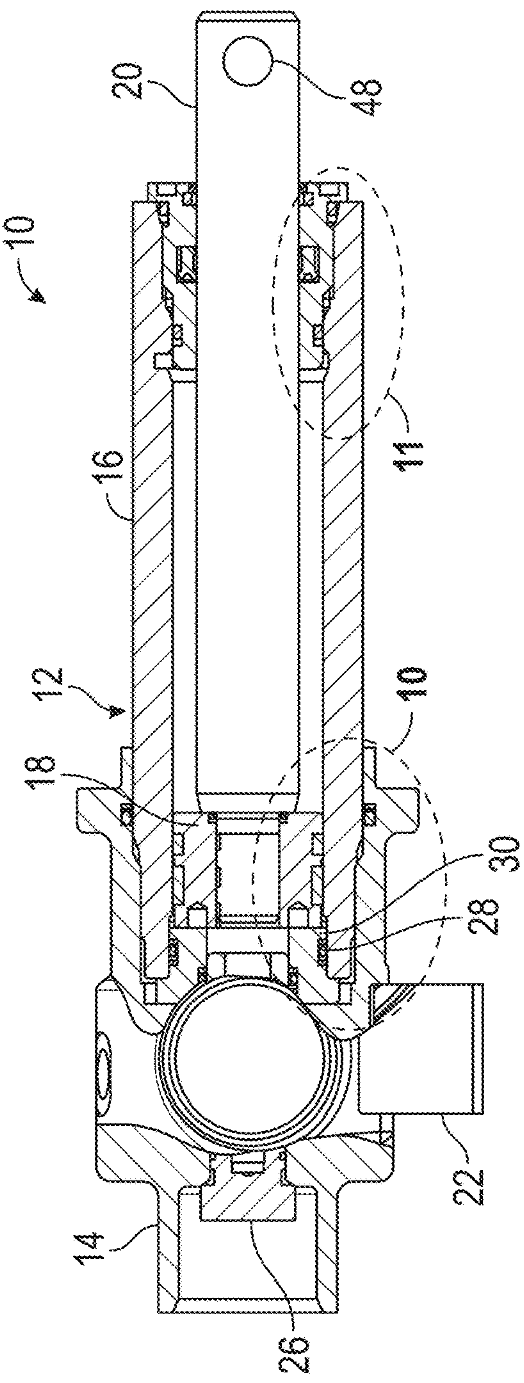
FIG. 7 is another sectional view of the hydraulic cylinder.

FIGS. 6 and 7 show additional views of the cylinder 10 with the seal plate 30 used to separate the extend and retract cavities within the cylinder housing 12. As shown in FIG. 6, the flange portion 32 of the seal plate 30 does not extend into the retract path 35, which allows the oil to pass thereby and through the path to exert a force upon the retract side of the piston 18.

Figure 8:
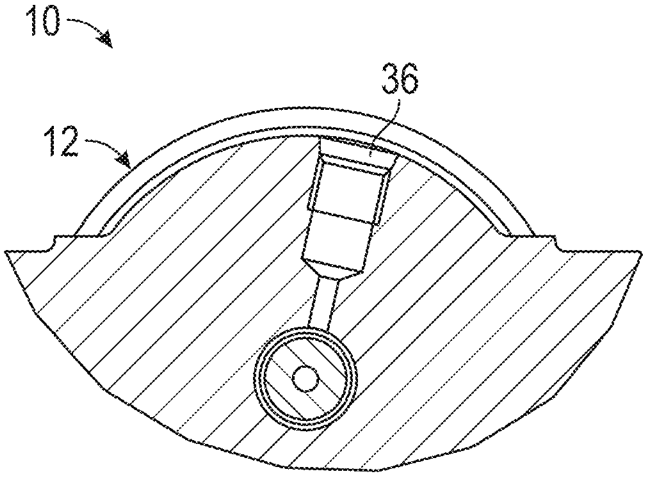
FIG. 8 is a partial sectional view showing the extend port.
Figure 9:
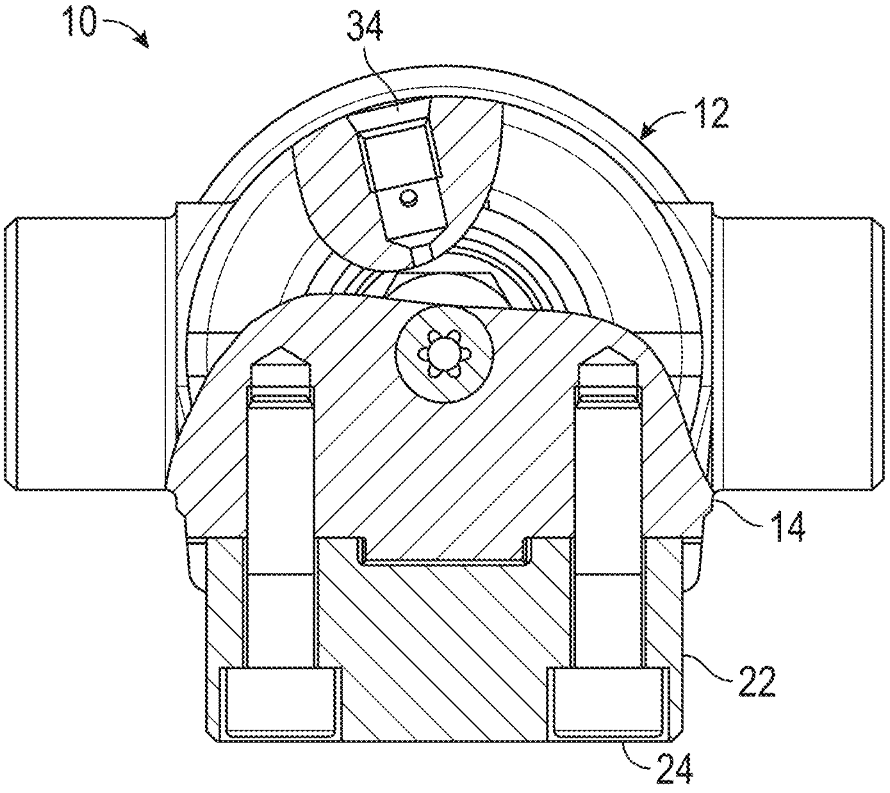
FIG. 9 is a partial sectional view showing the retract port.

FIGS. 8 and 9 show sectional views from the base end 14. The views show the location of the retract port 34 and the extend port 36 and how they are generally adjacent one another but radially offset. For example, according to at least some aspects of some embodiments, the ports are rotated approximately 13-degrees from a 12 O'clock position at the top of the housing. The 13-degrees refers to the axis of the ports. Thus, as shown, the retract portion is rotated counterclockwise approximately 13-degrees from the 12 O'clock position, and the extend port is rotated 13-degrees in the clockwise direction. This provides sufficient offset so that the ports can be used as positioned adjacent to each other.

As noted, FIG. 10 is an enlarged sectional view showing the piston 18 and the seal plate 30, including the addition of the seals, O-rings, and bands that are used to mitigate leaking of any of the cavities.

Figure 11:
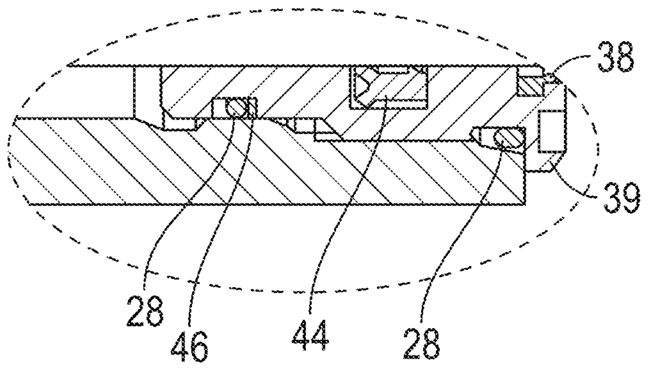
FIG. 11 is an enlarged sectional view showing a distal portion of the cylinder.

In addition, FIG. 11 is an enlarged sectional view of a portion of the cylinder tube 16, such as at or near a distal-most portion of the tube from the base end 14. Still additional components are found at this location. The components include, but are not limited to, a rod wiper 38, which is used to remove unwanted buildup on the cylinder rod 20 as it moves relative to the cylinder tube 16 during extension and retraction. The wiper 38 can be metallic or rubber and in addition to mitigating buildup, also mitigates unwanted materials and/or debris from entering into the cylinder housing 12. Such unwanted materials could cause operational issues if they are allowed to pass, including making it more difficult for the cylinder rod 20 to be able to move during retraction and extension.

Also shown is a head gland 39. The head gland or gland nut 39 is the component that attributes to the sealing system within the hydraulic cylinder 10. The purpose of the head gland 39 is to contain the pressurized hydraulic fluid inside the cylinder 10, stopping any leaks from the piston rod 20 and the cylinder head. These components have internal and external machining for seals including lubrication spirals and are made from various steel, cast steel, and cast iron. For example, as shown in the figure, the gland 39 can include O-rings 28, a rod seal 44, backup rings 46, and the like, which keep the hydraulic oil in the cylinder and also aid in sealing the end to mitigate unwanted material from entering.

Therefore, as has been shown and described, a cylinder 10 with extend and retract ports adjacent to one another at a base end of the cylinder provides numerous advantages, while still maintaining operability of the cylinder. The location of the ports allows for more freedom when determining where to mount the cylinder, as hydraulic lines to the ports are located close to one another so a common mounting path could be used. In addition, the use of the seal plate ensures that the hydraulic oil cavities and paths will remain independent of one another, which will ensure good operation of the cylinder.

The systems, methods, and/or apparatus as shown and/or described provide numerous advantages and/or improvements for the design and operation of hydraulic cylinders. It should be appreciated that any of the aspects of any of the embodiments could be combined to create yet additional embodiments, even those not explicitly disclosed, but which are part of the present disclosure. Variations or alternatives to any of the embodiments that are obvious to those skilled in the art are also to be considered a part of the present disclosure.

The invention claimed is:

1. A hydraulic cylinder, comprising:

a cylinder housing comprising a base end and a cylinder tube extending from the base end;

a piston and cylinder rod positioned in the cylinder tube, the piston adjacent a base end of the cylinder housing, wherein said piston comprises an extension side facing toward the base end and an opposite retraction side facing away from the base end;

an extension port and a retraction port positioned adjacent one another on the base end and comprising inputs into the cylinder housing, wherein the extension port is in fluid communication with the extend side of the piston via an extension path and the retract port is in fluid communication with the retract side of the piston via a retraction path; and a seal plate adjacent the piston at the base end of the cylinder housing, the seal plate sealing the retraction path from the extension path of hydraulic oil to aid in directing the oil to the desired side of the piston for extension and retraction.

2. The hydraulic cylinder of claim 1, wherein the retraction path extends from the retraction port, outside of the seal plate, and through a portion of the cylinder tube to the retraction side of the piston.

3. The hydraulic cylinder of claim 1, wherein the seal plate comprises a T-shape with a flange portion extending towards the retraction path to seal the retraction path from the extension path.

4. The hydraulic cylinder of claim 1, wherein the seal plate comprises O-rings at interior and exterior portions to aid in sealing.

5. The hydraulic cylinder of claim 1, further comprising a single check valve in line with the extension and retraction ports in the base end of the cylinder housing.

6. The hydraulic cylinder of claim 1, further comprising an aperture through a distal end of the cylinder rod.

7. The hydraulic cylinder of claim 1, wherein the extension and retraction ports are offset from one another at the base end of the cylinder housing.

8. The hydraulic cylinder of claim 1, further comprising a cylinder rod wiper at a distal end of the cylinder housing away from the base end, the cylinder rod wiper configured to clean a portion of the cylinder rod.

9. A hydraulic cylinder, comprising:

a cylinder housing comprising a base end and a cylinder tube extending from the base end;

a piston and cylinder rod positioned in the cylinder tube, the piston adjacent a base end of the cylinder housing, wherein said piston comprises an extension side facing toward the base end and an opposite retraction side facing away from the base end;

an extension port fluidly connected to an extension path for supplying a hydraulic fluid from the extension port to the extension side of the piston;

a retraction port fluidly connected to a retraction path for supplying the hydraulic fluid from the retraction port to a retraction side of the piston; and a T-shaped seal plate adjacent the piston at the base end of the cylinder housing, the seal plate sealing the retraction path from the extension path of hydraulic fluid; and a single check valve in fluid communication with the extension and retraction ports in the base end of the cylinder housing, wherein the extension port and retraction port are positioned adjacent one another on the cylinder housing.

10. The hydraulic cylinder of claim 9, wherein the retraction path extends from the retraction port, outside of the seal plate, and through a portion of the cylinder housing to a retraction side of the piston.

11. The hydraulic cylinder of claim 9, wherein the T-shaped seal plate comprises a flange portion extending towards the retraction path to seal the retraction path from the extension path.

12. The hydraulic cylinder of claim 9, wherein the seal plate comprises O-rings at interior and exterior portions to aid in sealing.

13. The hydraulic cylinder of claim 9, wherein the extension and retraction ports are offset from one another at the base end of the cylinder housing.

14. A method of operating a hydraulic cylinder, comprising:

extending a cylinder rod by supplying a hydraulic oil via an extension port and through an extension path to the extension side of a piston connected to the cylinder rod, wherein the extension side of the piston faces towards a base end of the hydraulic cylinder;

retracting the cylinder rod by supplying the hydraulic oil via a retraction port and through a retraction path to a retraction side of the piston, wherein the retraction side of the piston faces away from the base end of the hydraulic cylinder; and separating the extension and retraction paths with an end seal plate adjacent the piston at the base end of the cylinder housing;

wherein the extension port and the retraction port are positioned adjacent one another on the cylinder housing.

15. The method of claim 14, wherein the retraction path extends from the retraction port, outside of the seal plate, and through a portion of the cylinder housing to a retraction side of the piston.

16. The method of claim 14, further comprising passing the hydraulic oil through a single check valve in the extension path to mitigate back flow of the hydraulic oil in an unwanted direction.

17. The method of claim 14, wherein both the extension and retraction paths include a single check valve in line with the paths.

* * * * *